C. F. GAILOR.
STRUCTURAL CONNECTION.
APPLICATION FILED FEB. 3, 1913.
1,113,981.
Patented Oct. 20, 1914.
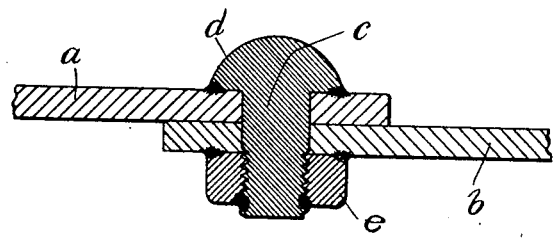
WITNESSES:
INVENTOR.
Chester F. Gailor:
BY
ATTORNEY.

UNITED STATES PATENT OFFICE.

CHESTER F. GAILOR, OF HARTFORD, CONNECTICUT.

STRUCTURAL CONNECTION.

1,113,981.  Specification of Letters Patent.  Patented Oct. 20, 1914.

Application filed February 3, 1913. Serial No. 745,784.

*To all whom it may concern:*

Be it known that I, CHESTER F. GAILOR, a citizen of the United States, and a resident of Hartford, in the county of Hartford and State of Connecticut, have invented certain new and useful Improvements in Structural Connections, of which the following is a specification.

This invention relates to novel means for permanently securing together metal members.

The drawing shows diagrammatically how the invention may be practised.

In the drawing a, b, denote pieces of structural metal adapted to be permanently secured together, c denotes a fastener passing through said members, d a head on the fastener at one end and e a head on the fastener at the other end which may or may not be removable from the fastener and take the form of a nut.

My invention consists in welding either or both of the heads of the fastener to a contacting surface, and in the case where one head of the fastener is removable one of the contacting surfaces to which it may be welded is the surface of the fastener and another contacting surface to which it may be welded is the surface of one of the members a or b, against which it happens to lie when in position.

I claim as my invention:

A structural iron work connection comprising a pair of lapped metal members having registering openings therein, a headed metal bolt passed through said openings and having its head engaging the adjacent metal member and cohesively united thereto by welding at the exposed contacting faces, a nut mounted on the other end of the bolt and engaging its adjacent metal member and cohesively united to the said metal member and bolt by welding at the exposed contacting faces alone.

CHESTER F. GAILOR.

Witnesses:
H. E. HART,
A. E. O'BRIEN.